2,972,170
METHYL METHACRYLATE MONOMER MOLDING PROCESS

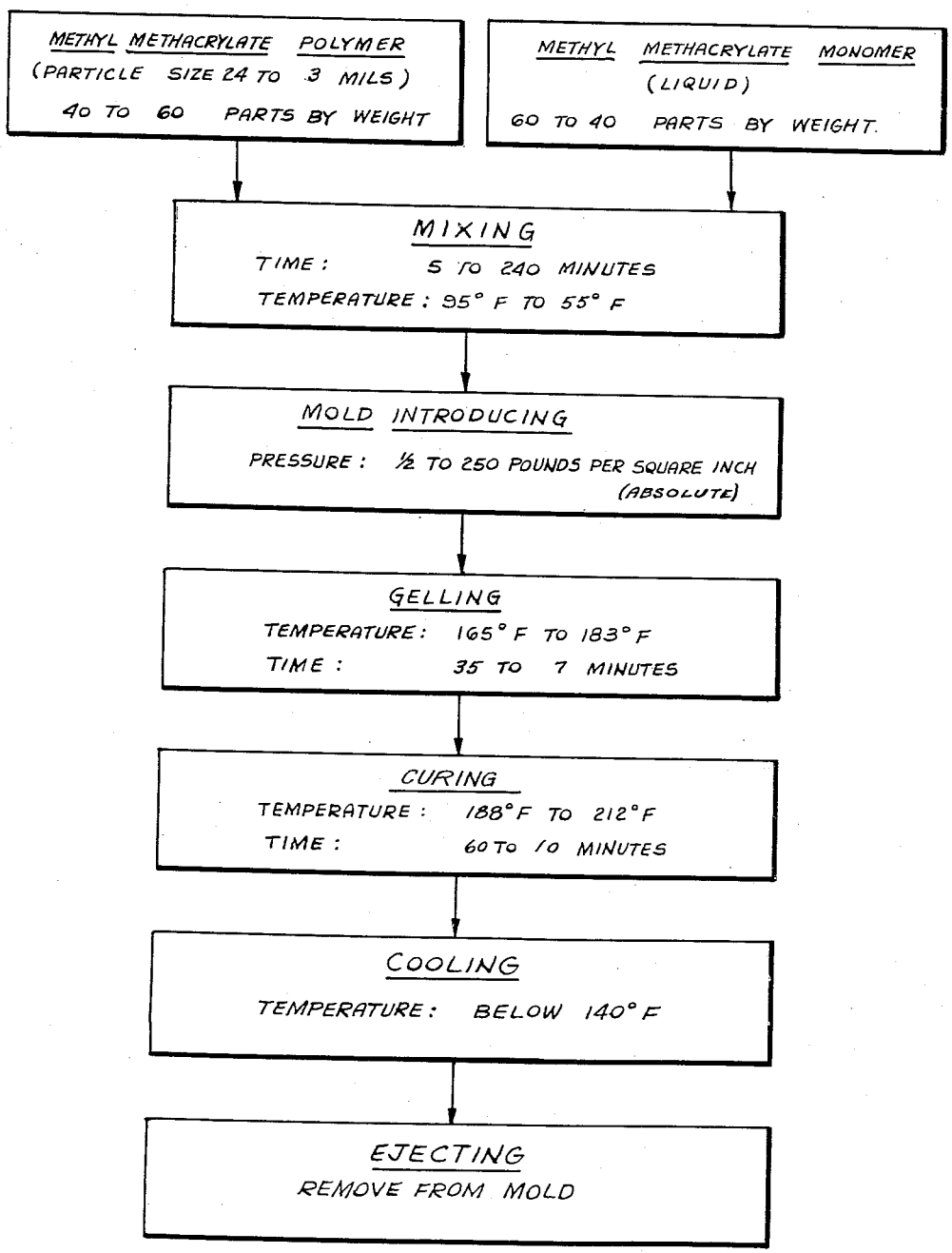

Lennox Birckhead, Jr., and Taylor A. Birckhead, Baltimore, Md., assignors to Birckhead Corporation, Baltimore, Md., a corporation of Maryland Filed June 17, 1957, Ser. No. 666,080

11 Claims. (Cl. 18—58)

Our invention relates to a method of molding objects from methyl methacrylate monomer and more particularly to a low pressure, low temperature molding method in which a mixture of finely divided methyl methacrylate polymer and liquid methyl methacrylate monomer are employed.

Throughout this discussion we use the term void to mean a bubble which contains vapor at a pressure of less than one atmosphere at the time the bubble is formed.

In the prior art wide use has been made of high polymers of methyl methacrylate for the injection molding of large and small objects. The solid polymer has been heated past its melting point to a temperature of say 450° F., for example, and then forced under a high pressure of 15,000 pounds per square inch, for example, into a closed relatively cool mold. Other methods have used compression molding employing temperatures in the range of 350° F. and 3,000 pounds per square inch.

The methyl methacrylate monomer which is normally liquid has been cast into massive bubble-free slabs, cylinders and other shapes. In such casting processes catalysts and powdered polymer have been admixed with the monomer to make a syrup which is cured or polymerized for long periods of say sixteen hours, or the like, at temperatures of the order of 148° F. to 178° F. Great care must be exercised in casting to avoid the formation of voids which result from the fact that methyl methacrylate shrinks approximately 21% as it is cured from liquid monomer to solid polymer.

Such items as dental plates have been molded from monomer-polymer dough to obtain tough, bubble-free molded objects by using pressures of 300 pounds per square inch and temperatures in the order of 178° F. In the dental plate molding techniques the polymer content of the dough has been very high. High polymer content reduces shrinkage.

It will be seen that the injection and compression molding methods require molds high in cost. Besides this the injection equipment is very expensive. In all of the methods of the prior art the resulting objects have a comparatively high specific gravity.

In many uses, as for example, light diffusing gratings for fluorescent lighting, it is desirable to use large castings which have comparatively light weight. This requires the castings to have a low specific gravity. Methyl methacrylate moldings have excellent light transmitting properties but are too heavy. A low specific gravity can be achieved by incorporating a plurality of small bubbles or voids throughout the mass of the molded article. Further weight reduction is possible if the webs of the gratings can be molded thinner.

One object of our invention is to provide a simplified and inexpensive method of making large and intricate moldings of methyl methacrylate polymer.

Another object of our invention is to provide a process of molding methyl methacrylate by forcing and controlling the formation of voids or bubbles of vapor during the molding process. This makes it unnecessary for the mold to move to follow up the shrinkage. It also results in a molding free from locked in shrinkage stresses.

A further object of our invention is to provide a process of molding methyl methacrylate using a molding composition having a relatively low viscosity thereby enabling us to mold complex shapes and thin cross-sections.

Still another object of our invention is to provide a method of molding methyl methacrylate monomer having an accelerated curing time thereby permitting us to produce greater quantities of molded objects from a given mold.

An additional object of our invention is to provide a method of making moldings of methyl methacrylate polymer which obviates the need for expensive injection molding equipment and costly molds.

Other and further objects of our invention will appear from the following description.

When a finely divided powder consisting of methyl methacrylate polymer is admixed with normally liquid methyl methacrylate monomer at elevated temperatures, polymerization of the mixture occurs. Polymerization is an eqothermic process and the temperature in the interior of the polymerizing mass will rise and cause boiling of the liquid monomer. Bubbles which appear in the finished moldings are comprised of monomer vapor or water vapor. Trapped air or entrained air may also cause bubbles in the finished molding. These bubbles are considered disadvantageous by the prior art and all molding methods of which we have any knowledge have for one object the elimination of these bubbles. This elimination is accomplished by permitting a slow enough polymerization so that bubbles will not be evolved and so that entrained bubbles will escape from the mass, or by the use of high pressure which will ensure that vapor does not form or remains dissolved in the solid polymer. This pressure must follow up the shrinkage caused by polymerization.

In general our invention contemplates the employment of a mixture of methyl methacrylate polymer in finely divided form and methyl methacrylate monomer in certain predetermined proportions, in which the polymer particle size is between predetermined limits. The mix is controlled under conditions in which no vapor is released, entrained air can escape, and the viscosity of the mix is sufficiently low so that the mixture can be introduced into an intricate mold at comparatively low pressures of below 250 pounds per square inch (absolute).

After the mix is introduced into the mold a critical gelling step is practiced. The particles disseminated through the mix have softened but not completely dissolved. They provide surfaces on which vapor nuclei form. The temperature has to be high enough to promote rapid polymerization which causes shrinkage voids or bubbles to form but not so high that large bubbles are created by boiling. After the gelling step, rapid polymerization at higher temperatures must occur in order to attain practical production rates. After the curing step the molded article can be cooled and ejected and will be found to have the desirable properties we seek to accomplish by our invention.

The accompanying drawing, which forms part of the instant specification and which is to be read in conjunction therewith, is a block diagram showing the sequence of steps comprising our process.

More particularly in carrying out our invention we powder methyl methacrylate polymer until its average particle size is between 24 mils and 3 mils in diameter.

It is to be understood, of course, that if the average particle size is 10 mils, for example, some particles may be very much larger and other particles may be very much smaller. It is impractical to obtain an absolutely uniform particle size. We are here dealing with the average particle size, which is sufficient for our purposes. We ensure that no particles will be so large that they will clog fine passages in the mold. We ensure also that not too many particles are so small that they will dissolve too rapidly and fail to accomplish their function of promoting the nucleation of many small bubbles. A quantity of from 40 to 60 parts by weight of finely divided methyl methacrylate polymer is admixed with 60 to 40 parts by weight of methyl methacrylate monomer. If the particle size is large it is advisable to use a greater proportion of monomer. With a smaller particle size less monomer may be used. If the average particle size is below 3 mils we have found that the polymer dissolves too rapidly to accomplish its object of establishing nuclei for bubbles. If the particle size is too large it will not soften and swell sufficiently and separation of monomer and polymer will occur before polymerization or during flow into the mold. If less than 40 parts by weight of monomer is employed the mixture becomes too thick for flowing properly into an intricate mold before the polymer particles are sufficiently softened to prevent jamming. If more than 60 parts by weight of monomer is used bubbles too large will be created because there will be areas of excessive monomer concentration where insufficient nuclei are provided and where the viscosity of the mix will be too low to control their rapid migration. The molecular weight of the polymer must be very high, especially when the average particle size is small in order to prevent too rapid dissolving of the polmer. The shape of the particle also has an important effect. Spherical particles dissolve more slowly than particles of irregular shape.

The finely divided polymer and the monomer are passed through a mixing zone and are mixed for a period between 5 minutes and 4 hours at temperatures between 95° F. and 55° F. The mixing should be sufficiently long so that all the polymer has begun to swell and soften. Too short a mixing period causes jamming of the mold during injection because of a sandy quality of the mix. Too long a period of mixing dissolves too many of the particles and precludes them from performing their function of controlling the formation of bubbles in the gelling stage. Too low a temperature of mixing slows down solution of polymer molecules which is necessary to thicken the mixture enough to keep the polymer particles from settling out of suspension during the gelling stage. A temperature of mixing too high speeds up the thickening of the mixture to a point where the material cannot be properly handled and where entrained air bubbles cannot be avoided in the mix when it is introduced into the mold. It is desired that no polymerization take place in the mixing step and that continuation of the dissolving of polymer particles be reduced as much as possible during the gelling step. Polymerization is initiated in the gelling state primarily by the catalyst which is activated at these elevated temperatures. The higher temperature of mixing requires the shorter time, while the lower temperature range mixing requires a longer time.

If the mix is properly formed all of the particles will be swelled and softened through the absorption of the monomer and there will be residual particles on which bubbles can be formed. These will be suspended in a monomer-polymer syrup.

During the mixing step, catalysts such as benzoyl peroxide in an amount from 1 part in 1,000 to 1 part in 100 by weight, and plasticizers such as dioctyl-phthalate or tricresyl-phosphate in an amount from 1 part in 100 by weight to 3 parts in 100 by weight, may be added.

If desired, pigments such as titanium dioxide may be added to the mix. These pigments can advantageously be dispersed in the plasticizer. Oil soluble dyes may be added to the mix to give the molded article any appropriate color. Lubricants such as neat's-foot oil or mold release agents such as stearic acid may be added at this point if desired in an amount up to three percent by weight.

A preferable average particle size is in the vicinity of 8 mils and a preferred mix would be 50 percent by weight of the methyl methacrylate monomer. Preferred mixing conditions would be 90 minutes at a temperature of 70° F. The preferred number average molecular weight of the polymer component is in the 500 thousand range.

Any appropriate mold may be used and the material is flowed into the mold either under vacuum, atmospheric pressure, or under pressures as high as 250 pounds per square inch. One of the advantages of our process is that low pressures can be used, thus avoiding the requirement of costly molds and presses. The pressure of injection into the mold is, of course, not critical. Higher pressures can be used if desired. The speed of injection must not be so great as to cause the solids in the mixture to strain out or air to be trapped.

After the mix thus prepared has been introduced into the mold the critical phase of our invention occurs. The mold and the mix are raised to a temperature between 165° F. and 183° F. This can be done conveniently by immersing the mold in a hot water bath maintained at the desired temperature. The time at the elevated temperature lies between 35 and 7 minutes. The time is governed both by the temperature and the amount of catalyst. If the catalyst present is benzoyl peroxide at a concentration of one percent of the monomer by weight and the temperature is at the upper limit of 183° F., a time period of 10 minutes will be employed. If no polymerization catalyst is used and the temperature is maintained at 165° F. the time period will be 35 minutes. If the temperature is raised above 183° F. the monomer boils in the presence of water vapor. Large bubbles will form which weaken or even destroy the structure. Such bubbles open up on the surface at the boundary between the molded article and the mold itself resulting in a pitted surface in the finished molding. We have found that it is desirable not to have bubbles larger in diameter than 20 mils. If the temperature is below 165° F., the desired size of bubbles will not form because the dissolving of the polymer goes too far before shrinkage, vapor pressure and other conditions necessary for bubble formation are achieved. The temperature range between 165° F. and 183° F. appears to be critical. Preferred conditions of gelling for a fifty/fifty mix containing 0.5 percent by weight catalyst based on the amount of monomer are a temperature of 183° F. and a time of 15 minutes.

After the bubbles have been formed and the gel exists it is important to finish the cure by rapid polymerization so as to release the mold and other equipment for another cycle. This is done by raising the temperature to between 188° F. and 212° F. This temperature range is less critical than the gelling temperature. However, the lower the temperature and the lower the catalyst concentration, the higher the molecular weight of the molded piece. Molecular weights above 100 thousand are desirable in that the moldings are stronger and tougher. The lower temperatures and lower catalyst concentrations produce the higher molecular weights by slowing down the cure. A balance must be chosen between the relative importance of molecular weight of product versus speed of molding cycle. Since we prefer to use water baths, the boiling point of water is the upper temperature. However, temperatures up to 480° F. could be used. A period of 10 to 30 minutes is usually all that is required. At 197° F. a period of 10 minutes suffices and at 191° F. a period of 30 minutes is adequate.

Holding the mold at an elevated temperature completes the polymerization and the article can then be removed from the mold. In order to facilitate this we prefer to cool the article in the mold by immersing it in a bath of cool water to reduce the temperature to below 140° F. so that the molds may be easily handled. A period of 2 minutes or more is easily adequate to cool molds to below 140° F. The molded piece can then be ejected from the mold and is ready for deflashing. Excessive cooling makes ejection less easy because of thermal shrinkage of the molded piece. Owing to the bubble formation, the finished molding will be found to fill the mold without shrinkage and will reproduce the surface detail of the mold with extreme fidelity. The molding contains tiny bubbles dispersed uniformly throughout its mass and none of the bubbles are sufficiently close to the surface to mar the same. In other words, each of the bubbles appears to be completly enelosed with the newly formed polymer. These bubbles occupy from 5 to 15 percent of the volume of the molded piece. The conditions are so controlled that none of the bubbles will be larger than 20 mils. As a matter of fact it is preferred that the bubbles be below 10 mils and that the greater percentage of them be smaller than this, say in the vicinity of 4 mils.

It is important to remember that the finished molding is not a foam which is characterized by being principally air with plastic formng only the interconnecting surfaces of the bubbles. The physical properties of our molded pieces are substantially the same as a solid molding with respect to rigidity. The molding, however, is appreciably lighter than one made of the solid polymer.

During the polymerization of methyl methacrylate monomer the separate molecules form long chains and the polymerization is accompanied by a shrinkage of volume approaching 21 percent. These shrinkage problems have prevented casting of methyl methacrylate from the monomer except for sheets, rods, and other simple shapes. If complex shapes were cast by the prior art the plastic collapsed and the shape and appearance of the piece was unacceptable. In our molding process the conditions are so controlled that when rapid polymerization starts, the particles by their lack of mobility block the excessive growth of voids or bubbles. Many new small bubbles form instead of a few bubbles growing large. The control of the bubble size prevents their rise before the mass gells sufficiently to preclude their migration. During their formation, the bubbles are believed to contain primarily monomer vapor. We believe that water and air dissolved in the monomer are "wrung out" as polymerization progresses, since these are less soluble in polymer than monomer. These minute droplets form on surfaces of polymer particles and in turn become the nuclei of monomer vapor shrinkage bubbles. In the finished piece it appears that these bubbles fill with air which we believe has diffused through the molding.

Examples of the practice of our method are as follows:

*Example 1*

A segmental mold consisting of 130 die cast strips of aluminum is racked up and clamped closed. The molding defined by the spaces in the mold is a grating having a hexagonal pattern.

The hexagons are ⅜ inch across and the webs ⁷⁄₁₆ inch deep, having a thickness of 40 mils. The webs have a 1° taper. The over-all dimensions of this grating are 2 feet in width and 4 feet in length.

An aluminum bottle with porcelain balls in it is filled with 1½ pounds of methyl methacrylate powder having an average particle size of 8 mils and 1½ pounds of methyl methacrylate monomer. To this mixture 0.2 ounce of benzoyl peroxide is added. The container is rotated in a room maintained at a temperature of 70° F. for a period of 90 minutes. The mixture is then forced into the mold by a superimposed air pressure of 20 pounds per square inch admitted to the top of the bottle which is provided with a suitable exit duct. The exit ports of the mold have been previously blocked by "Teflon" (tetrafluoroethylene polymer) bleeder plugs. After the mold has been filled the inlet manifolds are closed with chrome plated bars and the mold is dipped into a hot water bath maintained at a temperature of 183° F. for 11 minutes. The mold is then shifted to a second bath maintained at a temperature of 205° F. and held there for 10 minutes. The mold is then cooled in a bath maintained at 140° F. and the polymerized piece ejected by removing the segmental mold slabs in sequence. The finished piece is a 2 feet by 4 feet luminous ceiling grating which diffuses light. It contains tiny bubbles distributed uniformly throughout and yet has a smooth, polished surface all over.

*Example 2*

A dough mixer is fitted with a top. In it we place 40 pounds of finely divided methyl methacrylate polymer having an average particle size of 14 mils, 60 pounds of methyl methacrylate monomer, a ½ pound of titanium dioxide dispersed in 1 pound of tricresyl phosphate, and a ½ pound of benzoyl peroxide. The mixer is then run for 2½ hours at 60° F. This batch is used to fill a large number of molds.

Into the segmental mold of Example 1 we pump the mix thus formed until the exit ports emit several ounces of the mixture. The exit ports are then plugged with "Teflon" plugs and the mold is dipped into a bath of water maintained at 176° F. and kept there for 15 minutes. The mold is then removed and placed in a hot water bath maintained at 195° F. for 30 minutes. The mold is then shifted and cooled to room temperature and the piece extracted. The resulting grating is an opaque, white, lighting diffuser having superior color stability over a comparable injection molded polystyrene grating.

*Example 3*

A mixture was made in a ball mill of 50 percent methyl methacrylate polymer and 50 percent methyl methacrylate monomer. The average particle size was about 9 mils. One half of 1 percent by weight of the mix of benzoyl peroxide and 1 percent by weight of the mix of titanium dioxide was added. The titanium dioxide was dispersed in 1 percent by weight of dioctyl phthalate. 2% by weight of the mix of stearic acid was added as mold release. This mixture was rotated in the ball mill for 45 minutes and maintained at a temperature of 80° F. This mixture was then forced into a mold made of injection molded squares of suitable plastic at a pressure of 75 pounds per square inch. The mold was placed in a bath maintained initially at 183° F. After 12 minutes the temperature was raised to 212° F. by injecting steam into the bath and bringing the surrounding bath to a temperature of 212° F. rapidly. After an additional 13 minutes the mold was removed, cooled, and the molding ejected.

*Example 4*

A steel injection mold was cored for hot water and steam. It was filled with the mixture of Example 1 at an injection pressure of 250 pounds per square inch. Hot water at 167° F. was pumped through the mold ducts for a period of 20 minutes, then steam was passed through the same passages for a period of 15 minutes. The mold was then cooled by passing cold water through the same ducts and the molding removed from the mold. It was found to have the characteristic distribution of fine bubbles.

It will be seen that we have accomplished the objects of our invention. We have provided a simplified and inexpensive method of making large and intricate moldings of methyl methacrylate polymer. Our moldings are lighter than comparable moldings of the prior art owing to the fact that we generate and control the formation of bubbles or voids during the molding process. Our molding method employs a mold loading mixture of relatively low viscosity thereby enabling us to mold complex shapes. Our molded objects may be made in a comparatively short period of time thereby permitting us to produce greater quantities of molded objects from a given mold than is possible by casting. Our method avoids the need for expensive injection molding equipment. It will be observed that the difference between the setting temperature in the vicinity of 200° F. and the ejection temperature in the vicinity of 140° F. will cause only a slight shrinkage or expansion relative to the mold. This is sufficiently small so as not to interfere with the ejection of very delicate pieces, and there appears to be no discernable shrinkage resulting from the polymerization. It will also be appreciated by those skilled in the art that not only are these phenomena particularly helpful in the ejection of delicate pieces but moldings are produced which are unweakened by residual stresses.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. A method of forming polymerized methyl methacrylate moldings including the steps of mixing finely divided methyl methacrylate polymer having an average particle diameter between 24 mils and 3 mils with sufficient methyl methacrylate monomer to produce a flowable mixture in which the polymer particles are swelled but are not dissolved, introducing the mixture into a mold and there gelling the same at a temperature between 165° F. and 183° F. for a time between 35 minutes and 7 minutes, then raising the temperature of the gelled mass to complete the polymerization and removing the molding from the mold.

2. A method of forming polymerized methyl methacrylate moldings including the steps of forming a mixture of from 40 to 60 parts by weight of a comminuted methyl methacrylate polymer having an average particle diameter lying between 24 mils and 3 mils with methyl methacrylate monomer in an amount between 60 parts by weight and 40 parts by weight wherein the particles of polymer are swelled but are not dissolved, introducing the mixture thus formed into a mold and gelling the same at a temperature between 165° F. and 183° F. for a period between 35 minutes and 7 minutes, then curing the gel in the mold at an elevated temperature, cooling the molding thus formed and removing it from the mold.

3. A method of forming polymerized methyl methacrylate moldings including the steps of forming a mixture of from 40 to 60 parts by weight of a comminuted methyl methacrylate polymer having an average particle diameter lying between 24 mils and 3 mils with methyl methacrylate monomer in an amount between 60 parts by weight and 40 parts by weight at a temperature between 55° F. and 95° F. for a period between 240 minutes and 5 minutes, introducing the mixture thus formed into a mold and gelling the same at a temperature between 165° F. and 183° F. between 35 minutes and 7 minutes, then curing the gel in the mold at an elevated temperature, cooling the molding thus formed and removing it from the mold.

4. A method of forming polymerized methyl methacrylate moldings including the steps of forming a mixture of from 40 to 60 parts by weight of a comminuted methyl methacrylate polymer having an average particle diameter lying between 24 mils and 3 mils with methyl methacrylate monomer in an amount between 60 parts by weight and 40 parts by weight wherein the particles of polymer are swelled but are not dissolved, introducing the mixture thus formed into a mold at a pressure below 250 pounds per square inch absolute and gelling the same at a temperature between 165° F. and 183° F. between 35 minutes and 7 minutes, then curing the gel in the mold at an elevated temperature, cooling the molding thus formed and removing it from the mold.

5. A method of forming polymerized methyl methacrylate moldings including the steps of forming a mixture of from 40 to 60 parts by weight of a comminuted methyl methacrylate polymer having an average particle diameter lying between 24 mils and 3 mils with methyl methacrylate monomer in an amount between 60 parts by weight and 40 parts by weight wherein the particles of polymer are swelled but are not dissolved, introducing the mixture thus formed into a mold and gelling the same at a temperature between 165° F. and 183° F. for a period between 35 minutes and 7 minutes, then curing the gel in the mold at an elevated temperature of between 188° F. and 212° F. for a period between 60 minutes and 10 minutes, cooling the molding thus formed and removing it from the mold.

6. A method of forming polymerized methyl methacrylate moldings including the steps of forming a mixture of from 40 to 60 parts by weight of a comminuted methyl methacrylate polymer having an average particle diameter lying between 24 mils and 3 mils with methyl methacrylate monomer in an amount between 60 parts by weight and 40 parts by weight wherein the particles of polymer are swelled but are not dissolved, introducing the mixture thus formed into a mold and gelling the same at a temperature between 165° F. and 183° F. for a period between 35 minutes and 7 minutes, then curing the gel in the mold at an elevated temperature, cooling the molding thus formed to a temperature below 140° F. and removing it from the mold.

7. A method of forming polymerized methyl methacrylate moldings including the steps of forming a mixture of from 40 to 60 parts by weight of a comminuted methyl methacrylate polymer having an average particle diameter lying between 24 mils and 3 mils with methyl methacrylate monomer in an amount between 60 parts by weight and 40 parts by weight at a temperature between 55° F. and 95° F. for a period between 240 minutes and 5 minutes, introducing the mixture thus formed into a mold at a pressure below 250 pounds per square inch absolute and gelling the same at a temperature between 165° F. and 183° F. between 35 minutes and 7 minutes, then curing the gel in the mold at an elevated temperature, cooling the molding thus formed and removing it from the mold.

8. A method of forming polymerized methyl methacrylate moldings including the steps of forming a mixture of from 40 to 60 parts by weight of a comminuted methyl methacrylate polymer having an average particle diameter lying between 24 mils and 3 mils with methyl methacrylate monomer in an amount between 60 parts by weight and 40 parts by weight at a temperature between 55° F. and 95° F. for a period between 240 minutes and 5 minutes, introducing the mixture thus formed into a mold and gelling the same at a temperature between 165° F. and 183° F. between 35 minutes and 7 minutes, then curing the gel in the mold at an elevated temperature of between 188° F. and 212° F. for a period between 60 minutes and 10 minutes, cooling the molding thus formed and removing it from the mold.

9. A method of forming polymerized methyl methacrylate moldings including the steps of forming a mixture of from 40 to 60 parts by weight of a comminuted methyl methacrylate polymer having an average particle diameter lying between 24 mils and 3 mils with methyl methacrylate monomer in an amount between 60 parts by weight and 40 parts by weight at a temperature between 55° F. and 95° F. for a period between 240 minutes and 5 minutes, introducing the mixture thus formed into a mold and gelling the same at a temperature between 165° F. and 183° F. between 35 minutes and 7 minutes, then curing the gel in the mold at an elevated temperature, cooling the molding thus formed to a temperature below 140° F. and removing it from the mold.

10. A method of forming polymerized methyl methacrylate moldings including the steps of forming a mixture of from 40 to 60 parts by weight of a comminuted methyl methacrylate polymer having an average particle diameter lying between 24 mils and 3 mils with methyl methacrylate monomer in an amount between 60 parts by weight and 40 parts by weight at a temperature between 55° F. and 95° F. for a period between 240 minutes and 5 minutes, introducing the mixture thus formed into a mold at a pressure below 250 pounds per square inch absolute, gelling the same at a temperature between 165° F. and 183° F. between 35 minutes and 7 minutes, then curing the gel in the mold at an elevated temperature of between 188° F. and 212° F. for a period between 60 minutes and 10 minutes, cooling the molding thus formed and removing it from the mold.

11. A method of forming polymerized methyl methacrylate moldings including the steps of forming a mixture of from 40 to 60 parts by weight of a comminuted methyl methacrylate polymer having an average particle diameter lying between 24 mils and 3 mils with methyl methacrylate monomer in an amount between 60 parts by weight and 40 parts by weight at a temperature between 55° F. and 95° F. for a period between 240 minutes and 5 minutes, introducing the mixture thus formed into a mold at a pressure below 250 pounds per square inch absolute, and gelling the same at a temperature between 165° F. and 183° F. between 35 minutes and 7 minutes, then setting the gel in the mold at an elevated temperature of between 188° F. and 212° F. for a period between 60 minutes and 10 minutes, cooling the molding thus formed to a temperature below 140° F. and removing it from the mold.

References Cited in the file of this patent

UNITED STATES PATENTS

| Number | Name | Date |
|---|---|---|
| 2,045,651 | Hill | June 30, 1936 |
| 2,207,822 | Rooney et al. | July 16, 1940 |
| 2,234,993 | Vernon et al. | Mar. 18, 1941 |
| 2,284,335 | Meyer | May 26, 1942 |
| 2,347,320 | Hiltner | Apr. 25, 1944 |
| 2,370,562 | Meunier | Feb. 27, 1945 |
| 2,497,451 | Haefeli | Feb. 14, 1950 |
| 2,548,438 | McLoughlin | Apr. 10, 1951 |
| 2,559,345 | Church et al. | July 3, 1951 |
| 2,762,784 | Foust et al. | Sept. 11, 1956 |
| 2,806,822 | Ott | Sept. 17, 1957 |